United States Patent
Jouppi et al.

[11] Patent Number: 6,109,777
[45] Date of Patent: Aug. 29, 2000

[54] DIVISION WITH LIMITED CARRY-PROPAGATION IN QUOTIENT ACCUMULATION

[75] Inventors: Norman P. Jouppi, Palo Alto, Calif.; Joel J. McCormack, Boulder, Colo.; John H. Zurawski, Boxborough, Mass.

[73] Assignee: Compaq Computer Corporation, Houston, Tex.

[21] Appl. No.: 08/834,412

[22] Filed: Apr. 16, 1997

[51] Int. Cl.[7] .................................................. G06F 7/52
[52] U.S. Cl. ........................................................ 364/767
[58] Field of Search ..................................... 364/767, 766

[56] References Cited

U.S. PATENT DOCUMENTS

| | | | |
|---|---|---|---|
| 4,724,529 | 2/1988 | Irukulla et al. | 364/761 |
| 5,128,891 | 7/1992 | Lynch et al. | 364/767 |
| 5,132,925 | 7/1992 | Kehl et al. | 364/764 |
| 5,177,703 | 1/1993 | Mori | 364/767 |
| 5,258,944 | 11/1993 | Smith | 364/748 |
| 5,270,962 | 12/1993 | Fettweis | 364/766 |
| 5,357,455 | 10/1994 | Sharangpani et al. | 364/767 |
| 5,377,135 | 12/1994 | Kuroiwa | 364/767 |
| 5,404,324 | 4/1995 | Colon-Bonet | 364/761 |
| 5,504,915 | 4/1996 | Rarick | 395/800 |
| 5,673,215 | 9/1997 | Tsay | 364/767 |

OTHER PUBLICATIONS

"SRT Division Diagrams and Their Usage in Designing Custom Integrated Circuits for Division," Williams et al., Stanford Unvi. Technical Report, 1986.

"Computer Architecture: A Quantitative Approach," Second Ed., Patterson et al., Morgan Kaufmann Publishers Inc., San Francisco, Calif.

*Primary Examiner*—David H. Malzahn
*Attorney, Agent, or Firm*—Cesari and McKenna

[57] ABSTRACT

A computing system performs non-restoring division. Quotient selection logic selects quotient digits that are used to produce a final quotient. The quotient digits are selected according to a predetermined relationship among certain bits of the divisor and the partial remainder. Only non-zero quotient digits are selected. A quotient accumulator combines each selected quotient digit with a current partial quotient concurrently while each quotient digit is selected. The quotient digits are selected and combined until the final quotient is produced.

17 Claims, 11 Drawing Sheets

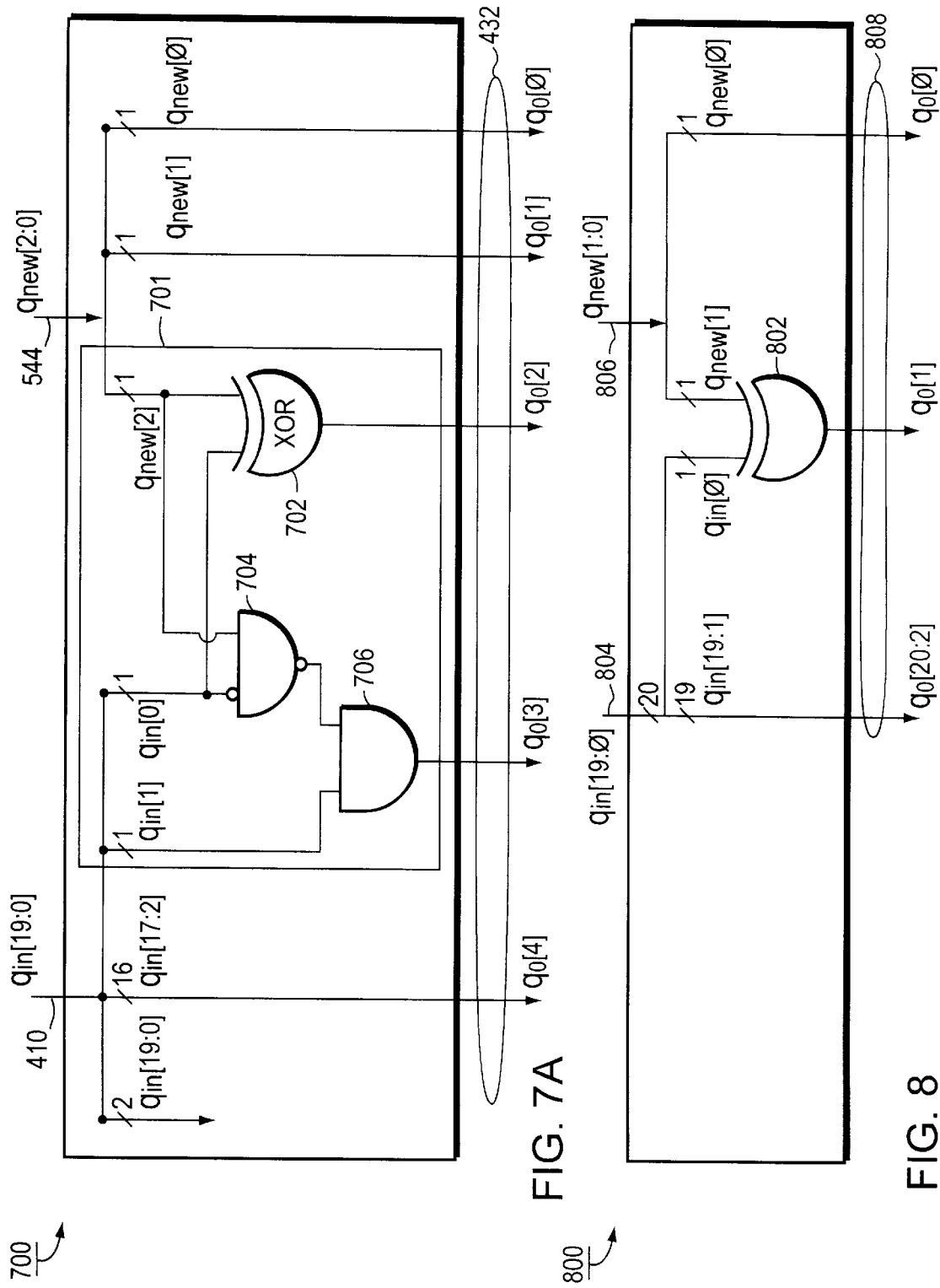

DIVISION WITH LIMITED CARRY-PROPAGATION IN QUOTIENT ACCUMULATION

FIELD OF THE INVENTION

This invention relates generally to arithmetic units in computing systems, and more particularly to a method and apparatus for performing non-restoring numerical division.

BACKGROUND

Computers are binary systems which represent information using signals that can take on only two discrete values, 0 and 1. Each digit of a binary number is a bit having one of the two discrete values. Consequently, computers perform arithmetic computations such as addition, subtraction, multiplication and division in base two. To simplify the arithmetic operations, computers can represent binary numbers in several well-known formats, such as two's complement and signed-magnitude.

The magnitude of a number is determined by adding the positional value of each digit in the number. The positional value of a digit depends upon the position of that digit in the base notation of the number. The positional value of each digit in the notation increases by a power of the base from the preceding digit position to the next digit position. For example in radix-2, the magnitude of the four-bit binary number $b_3 b_2 b_1 b_0$ is: $b_3 \times 2^3 + b_2 \times 2^2 + b_1 \times 2^1 + b_0 \times 2^0$.

Conceptually, computers perform division in base two similarly to the traditional base ten long division techniques taught in elementary school. Algorithms used by computers to perform division fall into two broad categories: restoring and non-restoring, see Hennessy and Patterson, *Computer Architecture A Quantitative Approach,* 2nd Edition, Morgan Kaufmann Publishers, Inc. 1996, describe ordinary restoring and non-restoring algorithms at pages A-3 to A-7. A restoring algorithm restores negative partial remainders by adding the divisor to the partial remainder before performing the next division iteration. The traditional elementary school long division technique is an example of a restoring algorithm. In contrast, non-restoring algorithms skip the restoring step and carry negative partial remainders into the next division iteration.

SRT DIVISION

SRT division, named for Sweeney, Robertson and Tocher, is a non-restoring algorithm devised to improve the performance of division computations.

An exemplary SRT algorithm appears at page A-47 of Hennessy and Patterson and proceeds as follows. For the purposes of this example the values of the divisor (D) and the partial remainder (PR) are positive and stored in shift registers.

1). If D has k leading zeros when expressed using n bits, shift D and PR registers left k bits.

2). Begin Loop:
For i=0, n−1,
(a) If the top three bits of PR are equal, select 0 for the quotient bit $q_i$ and shift the PR register one bit to the left.
(b) If the top three bits of PR are not all equal and PR is negative, select −1 for the quotient bit $q_i$, shift the PR register one bit to the left and add D.
(c) Otherwise select 1 for the quotient bit $q_i$, shift the PR register one bit to the left and subtract D. End loop.

3). If the final PR is negative, correct the final PR by adding D, and correct the final quotient by subtracting 1 from the least significant bit of the final quotient. Finally, shift the final PR k bits to the right, where k is the initial shift of D.

The effect of step 1 is to normalize both the divisor and the dividend. The selected quotient digit of each iteration of step 2 determines the operation for computing the next partial remainder according to the following equation taken from Williams and Horowitz, *SRT Division Diagrams and Their Usage in Designing Custom Integrated Circuits for Division,* Technical Report: CSLTR-87-326, November 1986, page 4, published by the Stanford University Computer Systems Laboratory:

$$PR_{i+1} = rPR_i - Dq_i$$

where

PR is the partial remainder at iteration i or i+1,
$q_i$ is the quotient digit selected in iteration i,
D1 is the divisor,
r1 is the radix, which is the base of a number system (e.g., radix-2 is base-2), The final iteration of the division may produce a negative remainder. If only positive remainders are allowed, Step 3 remedies this by subtracting 1 from the final quotient and adding the divisor to the partial remainder when the final partial remainder is negative.

Quotient Equation

The final quotient (Q) produced by the above exemplary SRT division algorithm is expressed by the equation:

$$Q = \sum_{i=0}^{n-1} q_i r^{-i}$$

where
r is the radix,
n is the number of quotient bits calculated,
Q is the accumulated final quotient, and
$q_i$ is the quotient bit determined from iteration i.
The equation is according to Williams and Horowitz, page 3.

Selection of Quotient Bits

Negative quotients make it possible to express a binary number in several different ways. For example, using the quotient digit set $\{-1, 0, 1\}$, the number 5 can be represented by 0101 or 0111, where 1 is the notation for −1. Thus, SRT division is said to use redundant quotient representation. This gives alternative choices when selecting a quotient digit during an iteration of the division operation.

The SRT division algorithm described above determines one quotient bit during each iteration. Higher radix SRT division can be implemented to produce more than one quotient bit per quotient digit selection. For example, radix-4 division produces 2 quotient bits and radix-8 produces 3 quotient bits per iteration.

Quotient Digit Set

The quotient digit set of the above-described SRT algorithm is $\{-1, 0, 1\}$. In a radix-4 implementation of SRT division, the quotient digit set would be $\{-2, -1, 0, 1, 2\}$.

In a binary system, however, all three digit values, 1, 0, and −1, cannot be represented by one bit. Typical solutions use one register to accumulate positive quotient bits (i.e., 1) and another register to accumulate negative quotient bits (i.e., −1). The quotient bit 0 is shifted into both registers whenever the quotient digit 0 is selected. Both registers are shifted whenever a quotient bit is placed in either register so as to give each quotient bit its appropriate positional value.

Final Quotient Determination

The final quotient is obtained by subtracting the binary value in the negative register from the binary value in the positive register at the end of the division operation. Consequently, such solutions use considerable hardware to calculate the final quotient, which may involve full-length carry propagation through an n-bit adder, a time-consuming operation.

Thus, there is a need for a method and an apparatus that can simplify the hardware and improve the performance when determining the final quotient in a non-restoring division operation.

SUMMARY OF THE INVENTION

The present invention resides in a method and related apparatus for performing non-restoring division. A division operation divides a dividend by a divisor to produce a final quotient and a remainder. Dividing the dividend by the divisor involves progressively choosing quotient digits, starting with the most significant quotient digit and ending with the least. The division progresses iteratively, with each iteration choosing a quotient digit and producing a new partial remainder. The final quotient results from the accumulation of successively chosen quotient digits.

In terms of the novel apparatus, the invention comprises means for selecting digits that are to be used in producing the final quotient. The means for selecting operates to only select digits that have a non-zero value. Means for combining combine each selected digit with a current partial quotient. The digits are selected and combined until the final quotient is produced. In one aspect of the apparatus, the means for combining operates to combine each selected digit with the current partial quotient currently as each digit is selected.

Each selected digit includes a sign portion that indicates whether each selected digit is negative or positive, and a magnitude portion representing an absolute value of each selected digit. Also, the current partial quotient is represented as digits including a least significant digit preceded by a series of one or more upper digits.

In another aspect of the invention, the means for combining operates to add the sign portion to the least significant digit when combining each selected digit to the current partial quotient. Further, the means for combining limits any carries produced by the adding from propagating to the series of upper digits of the current partial quotient. As a result, the sign of the selected digit is incorporated in the new current partial quotient, rather than merely indicating where the selected digit should be stored, as set forth in the prior art. Further, the limiting of the carry propagation simplifies implementations of the quotient accumulation, and reaps corresponding improvements in division performance.

In yet another aspect of the invention, the means for combining appends the magnitude portion to a result of adding the sign portion to the least significant digit of the current partial quotient, and prefixes the series of upper digits to a result of the appending.

In terms of the novel method, the invention selects only non-zero digits for use in producing a final quotient, and combines each selected digit with a current partial quotient. The selecting and combining are repeated until the final quotient is produced.

In one aspect of the method, the selecting and combining occur concurrently as each digit is selected. Thus, a new partial quotient is accumulated as each quotient digit is selected, rather than saving the selected digits for subsequent combining after all quotients digits have been selected.

In another aspect, the step of combining each selected digit with the current partial quotient includes adding a sign portion of each selected digit to a least significant digit of the current partial quotient; appending a magnitude portion of each selected digit to the result of the adding; and prefixing the series of upper digits of the current partial quotient to the result of the appending.

BRIEF DESCRIPTION OF THE DRAWINGS

FIG. 7A shows an exemplary implementation of the quotient accumulator of FIG. 5;

FIG. 8 shows an exemplary implementation of a quotient accumulator for a radix-2 divider;

DETAILED DESCRIPTION OF PREFERRED EMBODIMENTS

Figure 1:
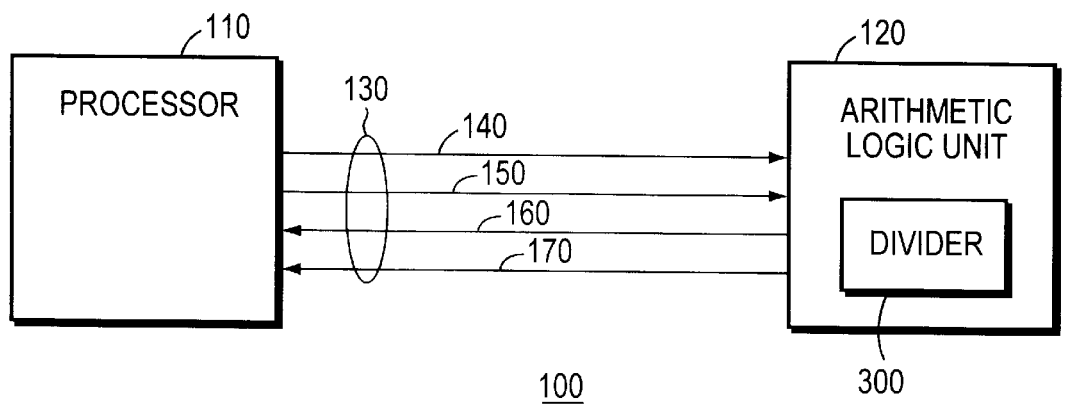
FIG. 1 shows a processor-based system including a divider circuit for use in practice of the invention.

FIG. 1 shows a computing system 100 including a processor 110 and a arithmetic logic unit (ALU) 120 coupled by a bus 130. The bus 130 includes signal lines 140, 150, 160, 170 for transferring data and instructions related to arithmetic operations such as addition, subtraction, multiplication and division. The ALU 120 can be used to perform floating point operations, and includes a divider 300 for performing numerical non-restoring division according to the principles of the invention.

During the operation of the system 100, the processor 110 executes instructions that perform arithmetic operations. For a numerical division operation, the processor 110 sends the ALU 120 the operands representing a normalized dividend on signal lines 140 and a normalized divisor on signal lines 150.

The ALU 120 returns the results of the division, which include a final quotient and a final remainder, to the processor 110. The final quotient is transferred on signal lines 160, and the final remainder is transferred on signal lines 170. The normalized dividend, normalized divisor, final quotient and final remainder are hereafter numerically identified by their associated signal lines 140, 150, 160, 170. In a preferred embodiment, the dividend, divisor, final quotient and remainder are each 20 bits in size. It should be understood that the principles of the invention can be applied where such values in the division have greater or lesser numbers of bits.

Figure 2:
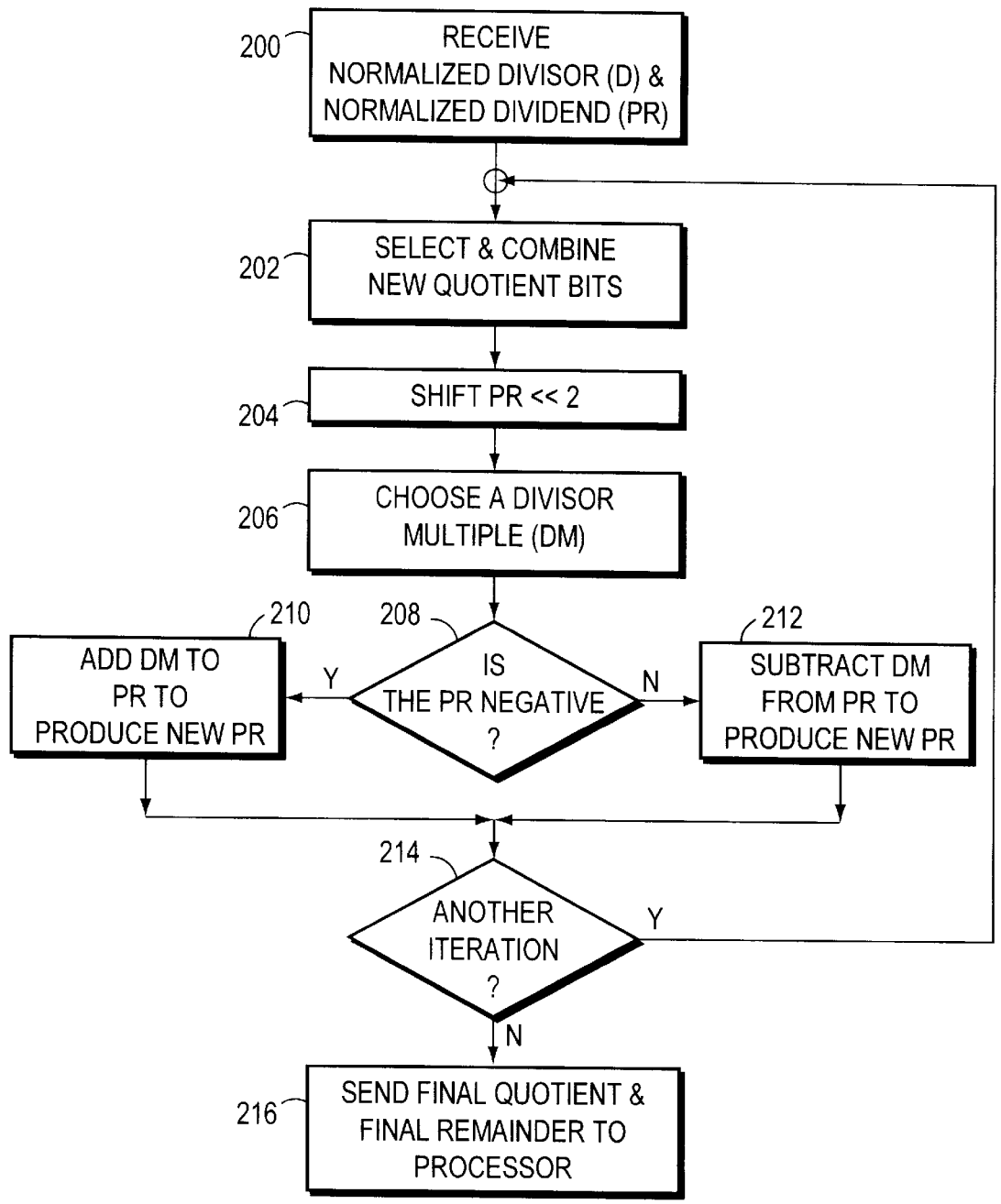
FIG. 2 shows exemplary steps that can be used by the divider to perform non-restoring division.

FIG. 2 shows exemplary steps that can be performed by the divider 300 to perform non-restoring division according to the principles of the invention. In a preferred embodiment, the steps 200–218 produce two new quotient bits during each iteration.

Initially, the ALU 120 receives operands from the processor 110 representing the normalized dividend 140 and normalized divisor 150 (step 200). For the purpose of describing the algorithm, a binary point is deemed to be immediately to the left of the most significant bit of the normalized divisor (D) 150 (e.g., D=1100$_2$ becomes 0.1100$_2$). Thus, the value of the divisor 150 lies in the half-open range of [0.5, 1.0), i.e., the minimum divisor value is 0.1000 . . . , which is 0.500 (in decimal) and the maximum divisor value is 0.11111 . . . , which is just less than 1.0 (in decimal).

As illustrated by steps 202–214, the division operation has an iterative phase. The number of iterations depends upon the number of quotient bits determined during each iteration and the size of the final quotient. In the preferred embodiment where the final quotient is 20 bits in size, and where the divider 300 selects two new quotient bits during each iteration, ten iterations are required.

For each iteration, the divider 300 selects and combines a new quotient digit with a partial quotient produced during the preceding iteration to produce a new partial quotient (step 202). The selected quotient digit includes two quotient bits and a sign bit. The selection of the new quotient digit is determined by a predetermined relationship among bits of the normalized divisor 150 and of the partial remainder (PR) as described in connection with FIG. 5.

In step 204, the bit values of the PR are shifted left by two bit positions (i.e., the PR is multiplied by 4). It is assumed at the start of each iteration that the incoming PR is in the half-open range [−D, +D]. Thus, the effect of shifting the PR is to expand the half-open range of the PR to [−4D, +4D].

In step 206, a divisor multiple is chosen. The choice is made so that the result of adding or subtracting the divisor multiple to the PR returns the PR to the half-open range [−D, +D). This guarantees that the assumption for the next iteration is met.

In step 208, the sign of the PR is examined to determine whether the divisor multiple is to be added to, or subtracted from the PR. If the PR is negative, then the divisor multiple is added to produce a new partial remainder (step 210). Otherwise, the divisor multiple is subtracted from the PR (step 212).

In step 214, if there are other iterations to be performed, then division operation returns to step 202. Otherwise, the division operation exits the iterative phase and enters the restorative phase. At this point in the division, the divider 300 has produced a final quotient 160 and final partial remainder (FPR) 170. In step 216, the final quotient 160 and FPR 170 are sent to the processor 110.

Figure 3:
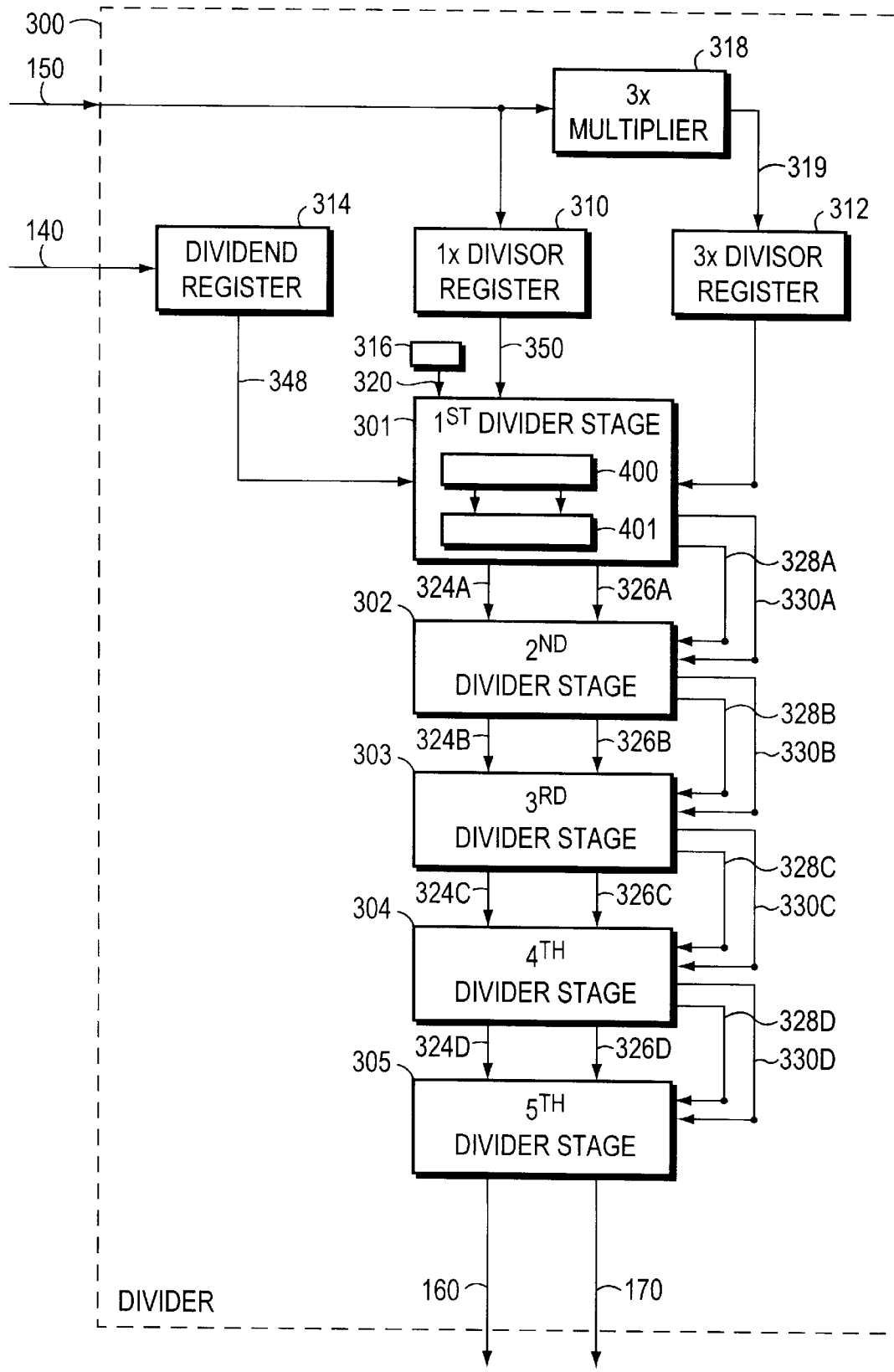
FIG. 3 shows the divider of FIG. 1 including five divider stages arranged in a pipeline.

FIG. 3 shows the exemplary divider circuit 300 of FIG. 1 including five divider stages 301–305 arranged as a pipeline. The divider 300 includes a 1x-divisor multiple register 310, a 3x-divisor multiple register 312, a dividend register 314, a 3x-multiplier 318, and register 316. The divider stages 301–305 are coupled to adjacent divider stages by four sets of signal lines 324A–D, 326A–D, 328A–D, 330A–D. The fifth divider stage 305 is connected to the processor 110 by signal lines 160 and 170. Each divider stage 301–305 includes two divide step units arranged as illustrated by divide step units 400, 401 in the first divider stage 301.

The 1x-divisor multiple 310, 3x-divisor multiple 312 and dividend registers 314 are coupled to the first divider stage 301. The 1x-divisor multiple register 310 and the 3x-divisor multiple 312 is coupled to receive the normalized divisor by signal lines 150. The 3x-multiplier 318 is coupled to the 3x-divisor register 312 by signal lines 319.

In the preferred embodiment, the divisor 150 is a positive 20-bit number. The most significant bit of the divisor 150 is part of the divisor value, and not used to represent the sign. Registers 310, 312 and 318 are each 20 bits wide in order to accommodate the divisor 150.

The dividend register 314 is coupled to receive the normalized dividend by signal lines 140. The dividend 140 stored in the dividend register 314 serves as the initial partial remainder. In the preferred embodiment, the dividend 140 is a 20-bit two's complement number. The most significant bit of the dividend register 314 represents the sign of the dividend 140. Register 316 is coupled to the first divider stage 301 by signal lines 320, and stores an initial partial quotient having a value of zero.

General operation of the exemplary divider 300 with respect to FIGS. 1–3 is now described. The processor 110 sends the normalized dividend 140 and the normalized divisor 150 to the ALU 120. Rather than receive these operands 140, 150 as already normalized, the ALU 120 instead may normalize the dividend 140 or the divisor 150. The ALU 120 directs the dividend 140 to the dividend register 314, and the divisor 150 to the 1x divisor register 310 and to the 3x multiplier 318.

The 3x-multiplier 318 produces and sends a 3x-multiple of the divisor 150 to the 3x-divisor multiple register 312 (i.e., the value stored in the 3x-divisor multiple register 312 is the normalized divisor 150 multiplied by 3).

During a system clock cycle, the first divider stage 301 receives the initial partial remainder from the dividend register 314, the 1x-divisor multiple from the 1x-divisor register 310, and the 3x-divisor multiple from the 3x-divisor register 312, and produces a partial quotient and a partial remainder. During a subsequent system clock cycle, the first divider stage 301 issues the partial quotient on signal lines 324A and the partial remainder on signal lines 326A to the second divider stage 302.

Similarly, the intermediate divider stages 302–304 each receive a partial quotient and a partial remainder from a previous divider stage in the pipeline, along with the 1x-divisor multiple and the 3x-divisor multiple, and produce a new partial quotient and a new partial remainder for sending to the next divider stage. Partial quotients are issued on appropriate signal lines 324B–D and partial remainders on appropriate signal lines 326B–D.

The fifth and final divider stage 305 produces the final quotient and the final remainder of the division operation and sends the final quotient by signal lines 160 and the final remainder by signal lines 170 to the processor 110. In a preferred embodiment, the final quotient is accumulated in five system clock cycles with each divider stage 301–305 determining four quotient bits of the final 20-bit quotient.

Figure 4:
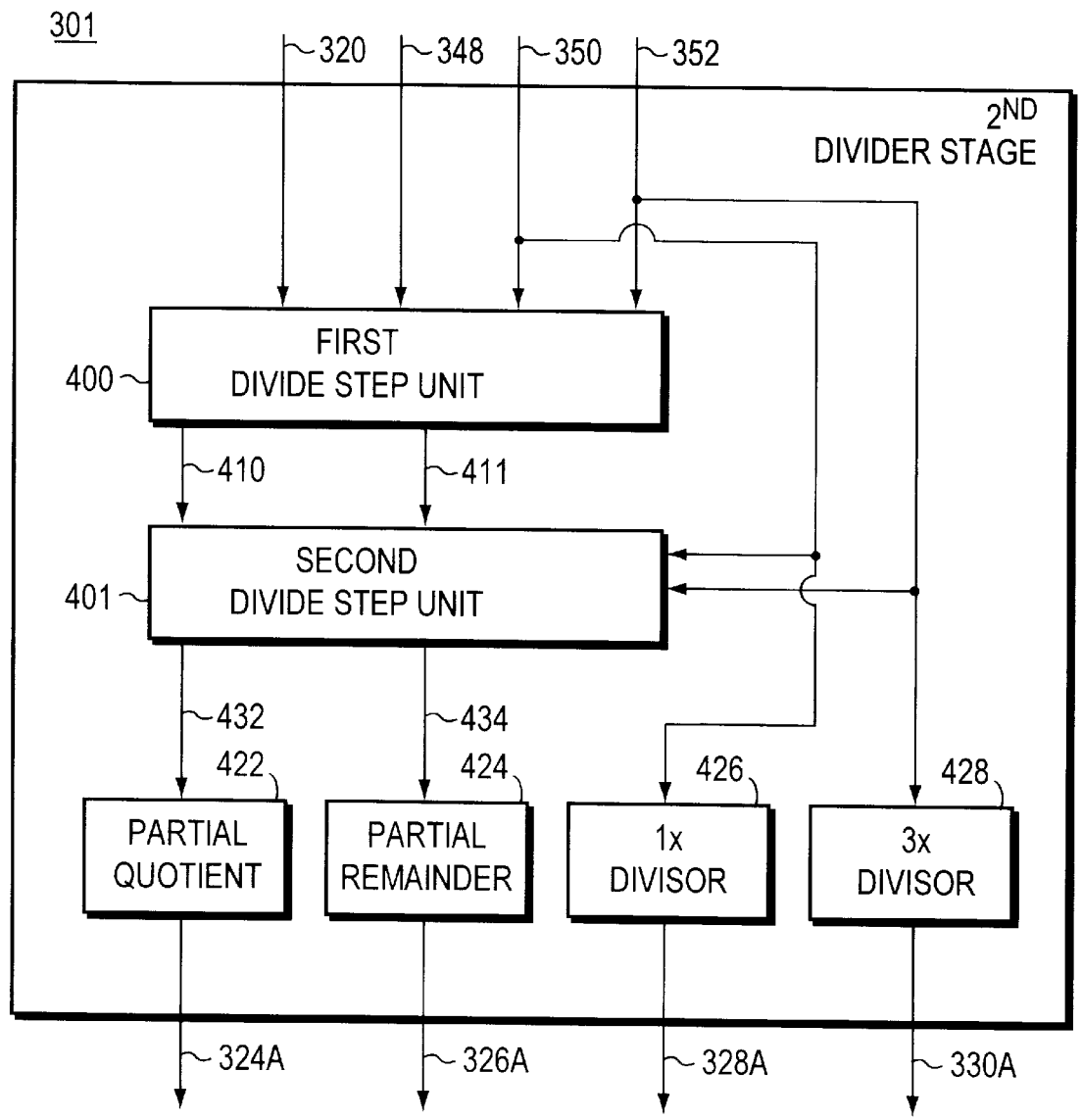
FIG. 4 shows a divider stage from FIG. 3 including two divide step units in series.

FIG. 4 shows the first divider stage 301 as a representative example of each of the five divider stages 301–305. The first divider stage 301 includes two divide step units 400 and 401 coupled to each other in series by signal lines 410–412, a partial quotient latch 422, a partial remainder latch 424, a 1x-divisor latch 426, and a 3x-divisor latch 428.

The first divide step unit 400 is coupled to receive the initial partial quotient 320, and an initial partial remainder 348 (initially the normalized dividend). The first divide step unit 400 receives the initial partial remainder from the dividend register 314 on signal lines 348 and the initial partial quotient from the register 316 on signal lines 320.

The second divide step unit 401 is coupled to receive a partial quotient on signal lines 410, and a partial remainder on signal lines 411 from the first divide step unit 400. Both divide step units 400 and 401 are coupled to receive signals representing a 1x-divisor multiple 350 from the register 310 and a 3x-divisor multiple 352 from the register 312.

The 1x-divisor latch 426 is coupled to the output of the 1x-divisor register 310 by signal lines 350 and to the input of the next divider stage 302 of FIG. 3 by signal lines 328A. The 3x-divisor latch 428 is coupled to the output of the 3x-divisor register 312 of FIG. 3 by signal lines 352 and to the input of the next divider stage 302 by signal lines 330A. The second divide step unit 401 is coupled to the partial quotient latch 422 by signal lines 432 and to the partial remainder latch 424 by signal lines 434.

Figure 5:
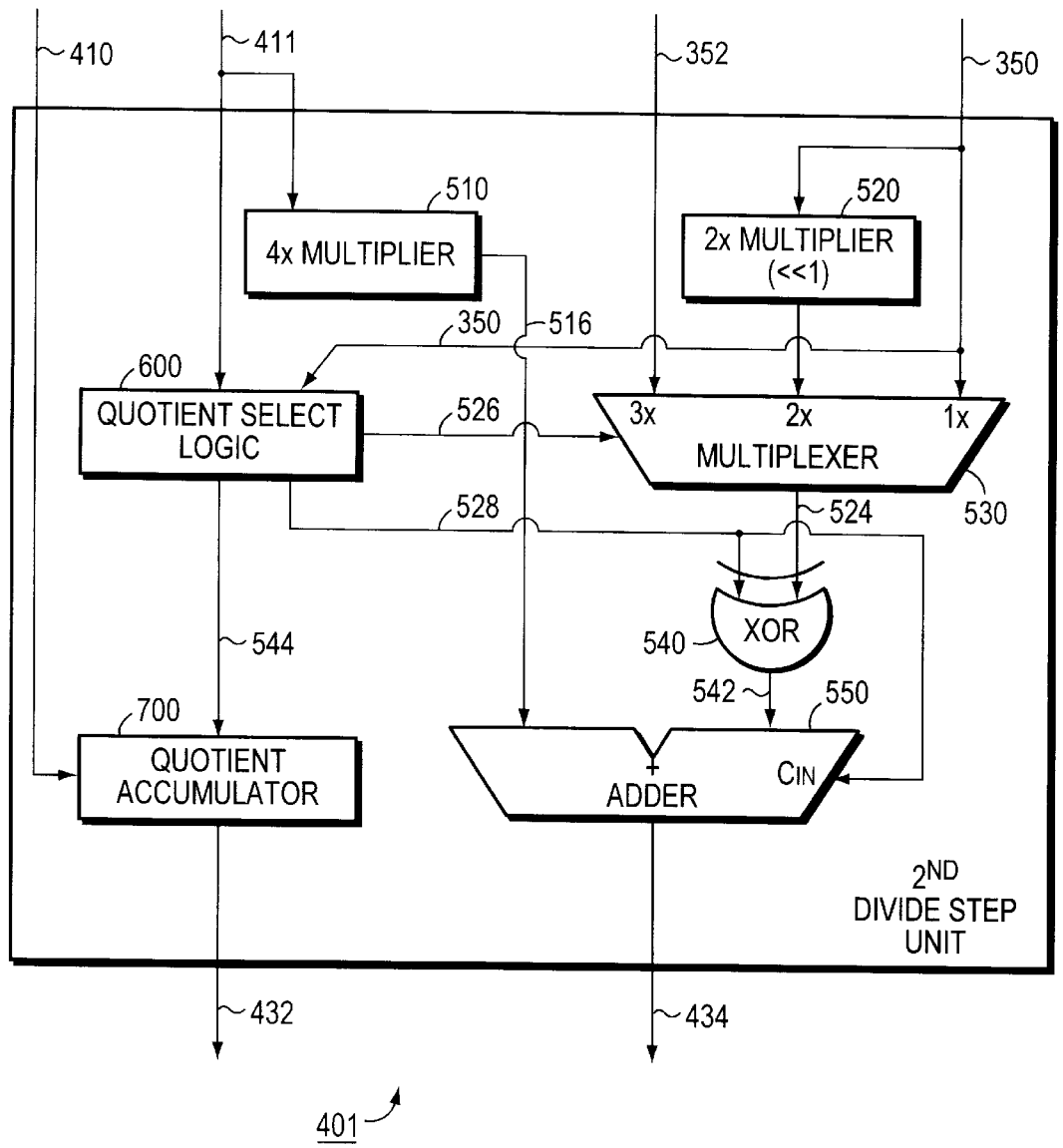
FIG. 5 shows the second divide step unit of FIG. 4 including quotient select logic and a quotient accumulator.

FIG. 5 shows the second divide step unit 401 of FIG. 4 including quotient select logic 600, a quotient accumulator 700, a 4x-multiplier 510, a 2x-multiplier 520, a multiplexer 530, exclusive-or (XOR) circuit 540, and an adder 550. The second divide step unit 401 of the first divider steps 301 is a representative example of the divide step units of the divider stages 301–305.

The 4x-multiplier 510 includes an input for receiving the partial remainder on signal lines 411, and one output for providing a multiplied partial remainder to the adder 550 via signal lines 516. The 4x-multiplier 510 is implemented as a two-bit shifter that shifts each bit value of the partial remainder to the left by two bit positions. The two-bit shift, in effect, multiplies the partial remainder by four.

The 2x-multiplier 520 produces a 2x divisor multiple from the 1x-divisor multiple provided on signal lines 350, and supplies the 2x-divisor multiple to the multiplexer 530 on signal lines 522. The 2x-multiplier 520 is implemented as a one-bit shifter that shifts each bit value of the 1x-divisor multiple 350 one bit position to the left, and moves a bit value of zero into the least significant bit position of the 2x-divisor multiple.

The multiplexer 530 includes three inputs for receiving binary data on signal lines 350, 352 and 522 and one output for transmitting the binary data of one of the three inputs to the XOR circuit 540 on signal lines 524. The multiplexer 530 includes a fourth input for receiving binary data on selection lines 526.

The XOR circuit 540 includes two inputs: signal lines 524 providing the divisor multiple selected by the multiplexer 530, and control line 528 controlling whether the binary value of that selected divisor multiple is complemented. The XOR circuit 540 exclusive-ORs each bit of the divisor multiple with the bit value on control line 528 and outputs the result to the adder 550 on signal lines 542. The result is the complement of the selected divisor multiple when the bit value of the control line 528 is 1, and the unaltered divisor multiple when the bit value is 0. For example, in the instance where the binary value of the divisor multiple on signal lines 524 is 1001$_2$, the XOR circuit 540 sends the binary value 0110$_2$ to the adder 550 when the control line 528 has a bit value of 1, and sends the binary value 1001$_2$ when the control line 528 is 0.

The adder 550 includes three inputs: signal lines 516 providing the multiplied partial remainder; signal lines 542 providing the binary value of the selected divisor multiple; and the bit line 528 serving as a carry-in input. The adder 550 adds the binary values supplied on the three inputs 516, 542 and 528 and outputs the binary result, a new partial remainder, to the partial remainder latch 424 via signal lines 434.

In the preferred embodiment, the adder 550 of the second divide unit 401 is implemented as a 20-bit full adder. Note that the number of partial remainder bits that remain to be processed is reduced by two with each two-bit shift of the partial remainder. Thus, the implementation of each adder of subsequent stages 302–305 can be smaller than the adder of the preceding divide step unit by two bits (by one bit for radix-2, and by three bits for radix-8). Thus, the amount of circuitry needed to implement an adder such as adder 550 decreases by the radix as one moves further down the pipeline of the divider stages 301–305. Similarly, each partial remainder (PR) latch, 1x-divisor latch, and 3x-divisor latch of subsequent divider stages 302–305 can be implemented with four less bits than the corresponding latches of the preceding stage.

The quotient select logic (QSL) 600 includes two inputs: one input is for receiving the normalized 1x-divisor multiple on signal lines 350, and the other is for receiving the partial remainder on signal lines 411. In the preferred embodiment, only the second most significant bit of the 1x-divisor multiple and the four most significant bits of the partial remainder are sent to the QSL 600. The QSL 600 determines from the binary values of these particular data bits which one of the quotient digits in the group of quotient digits {−3, −2, −1, 1, 2, 3} to select. A predetermined relationship between the five data bits and the selected quotient digit is discussed further in connection with FIG. 6.

The QSL 600 includes three outputs: the first output is for indicating a divisor multiple selection to the multiplexer 530 on selection lines 526; the second output is for indicating to the XOR circuit 540 whether to complement the selected divisor multiple, and for providing a carry-in signal to the adder 550 on the control line 528; and the third is for sending the binary values of the selected quotient digit to the quotient accumulator 700 on the quotient selection lines 544.

The quotient accumulator 700 is coupled to the QSL 600 by the quotient selection lines 544 for receiving the binary values representing the selected quotient digit. The quotient accumulator 700 includes an input for receiving a partial quotient from the previous divide step unit 400 on signal lines 410, and an output for sending a new partial quotient to the partial quotient latch 422 on signal lines 432. The implementation of the quotient accumulator 700 is discussed further in connection with FIG. 7A.

Operation of the exemplary divider 300 with respect to FIGS. 4–5 is now described. The two divide step units of each divider stage 301–305 each determine two quotient bits of the final quotient. The operation of the second divide step unit 401 is representative of the operation of the divide step units of the divider 300 with noted exceptions.

The 4x-multiplier 510 receives the partial remainder on signal lines 411, multiplies the partial remainder by four and sends the multiplied partial remainder to the adder 550 on signal lines 516.

The QSL 600 selects a quotient digit according to the predetermined relationship among four partial remainder bits and a divisor bit as set forth below in FIG. 6 and in Table A. According to the principles of the invention, a quotient digit of 0 is not selected. The selected quotient digit, which includes a sign bit and two magnitude bits, is sent to the quotient accumulator 700 on signal lines 544. The sign bit indicates whether the selected quotient digit is negative or positive. The magnitude bits represent the absolute value of the selected quotient digit.

The QSL 600 sends the two magnitude bits of the selected quotient to the multiplexer 530 via signal lines 526. The multiplexer 530 selects one from among the 3x-multiple of the divisor on signal lines 352, the 2x multiple on signal lines 522 and the 1x-multiple on signal lines 350 according to the magnitude bits. For example, when the two magnitude bits are 112, then the multiplexer 530 selects the 3x-divisor multiple.

The QSL 600 inverts the sign bit of the selected quotient digit, and sends the inverted sign bit to the XOR gate 540 and to a carry-in ($C_{in}$) input of the adder 550 on control line 528. (Note that the sign bit of the selected quotient digit and the sign of the partial remainder are the same.) When the sign bit is 0, the XOR gate 540 receives an inverted sign bit value of 1, produces a complement of the selected divisor multiple received on input 524, and sends the complement to an input 542 of the adder 550. The value of the $C_{in}$ input is then added to the complemented divisor multiple. In effect, the selected divisor multiple has been two's complemented, and the addition performed by the adder 550 effectively subtracts the selected divisor multiple from the partial remainder. In the method of non-restoring division described in FIG. 2, a divisor multiple is subtracted from the partial remainder when the partial remainder is not negative (i.e., positive or zero).

When the sign bit is 1, the selected divisor multiple received on input 524 of the XOR gate 540 is not complemented when sent to the adder 550. The value of $C_{in}$ input is 0. Thus, the addition performed by the adder 550 adds the selected divisor multiple to the partial remainder. The method of non-restoring division described in FIG. 2 indicates that a divisor multiple is added to the partial remainder when the partial remainder is negative.

The adder 550 issues the new partial remainder to the partial remainder latch 424 on signal lines 434.

The quotient accumulator 700 combines the selected quotient digit received on signal lines 544 with the partial quotient from the previous divide step unit 400 received on signal lines 410. The quotient accumulator 700, in effect, multiplies the partial quotient by four (i.e., shifting left by 2 bit positions) and adds the selected quotient digit. The implementation of the quotient accumulator 700 is described in greater detail in connection with FIGS. 7A–7B.

Figure 6:
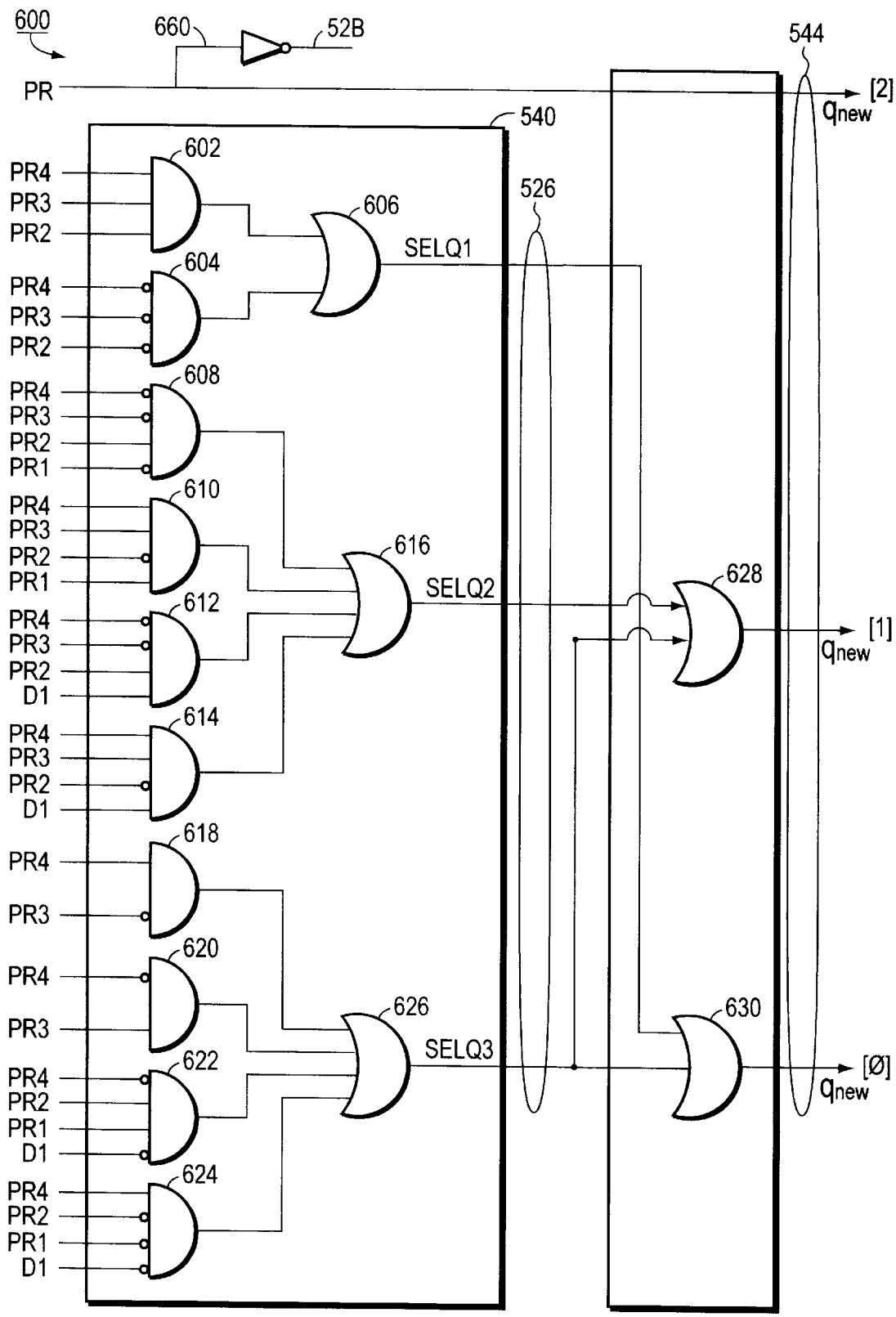
FIG. 6 shows an exemplary implementation of the quotient select logic of FIG. 5.

FIG. 6 shows an exemplary implementation of the quotient select logic 600 including a circuit 640 for selecting quotient digits according to the principles of the invention, and a circuit 650 for producing signals $q_{new}[2:0]$, which represent the selected quotient digit. The QSL 600 further includes an inverter 660 for inverting the sign bit, PR4, of the partial remainder. The inverted sign bit is sent to the XOR circuit 540 and the $C_{in}$ input of the adder 550 on control line 528.

The circuit 640 includes logic gates 602–626. The circuit 650 includes logic gates 628–630. Various other implementations of logic gates may be used to achieve equivalent quotient digit selection and signal representation as the logic gate 602–630.

The logic gates 602–626 produce signals SELQ1, SELQ2 and SELQ3. The logic gates 628–630 produce signals $q_{new}[2:0]$ from the signals SELQ1, SELQ2 and SELQ3. Signals SELQ1, SELQ2 and SELQ3 are presented to the multiplexer 530 of FIG. 5 via signal lines 526 to select a divisor multiple. Only one of the three signals, SELQ1, SELQ2, and SELQ3, is asserted high (i.e., binary value=1) at any one time. Signals $q_{new}[2:0]$ are passed to the quotient accumulator 700 of FIG. 5 via signal lines 544.

To produce signals SELQ1, SELQ2 and SELQ3, the logic gates 602–626 process the four most significant bits of the partial remainder, PR4, PR3, PR2, and PR1, received on signal lines 326A, and the second most significant bit of the divisor, D1, received on signal lines 328A. The bit value of the most significant bit of the divisor is always one as a result of the normalization and need not be considered by the QSL 600 in the selection of the quotient digit.

The QSL 600 is implemented to select a quotient digit from the set of quotient digits {−3, −2, −1, +1, +2, +3} in accordance to Table A. In Table A below, the quotient digit zero is notably absent from the selected quotient digit column. The ability to express final quotients in redundant expressions enables the use of a quotient digit set that does not have the digit zero.

In Table A, the selected quotient digit is expressed in signed-magnitude format, from the most significant to the least significant bit. The four most significant partial remainder bits and the second most significant divisor bit are expressed in binary.

TABLE A

| DIVISOR D1 | PARTIAL REMAINDER PR[4:1] | SELECTED QUOTIENT DIGIT $q_{new}[2:0]$ |
|---|---|---|
| 0 | 1000 | 111 (−3) |
| 0 | 1001 | 111 (−3) |
| 0 | 1010 | 111 (−3) |
| 0 | 1011 | 111 (−3) |
| 0 | 1100 | 111 (−3) |
| 0 | 1101 | 110 (−2) |
| 0 | 1110 | 101 (−1) |
| 0 | 1111 | 101 (−1) |
| 0 | 0000 | 001 (+1) |
| 0 | 0001 | 001 (+1) |
| 0 | 0010 | 010 (+2) |
| 0 | 0011 | 011 (+3) |
| 0 | 0100 | 011 (+3) |
| 0 | 0101 | 011 (+3) |
| 0 | 0110 | 011 (+3) |
| 0 | 0111 | 011 (+3) |
| 1 | 1000 | 111 (−3) |
| 1 | 1001 | 111 (−3) |
| 1 | 1010 | 111 (−3) |
| 1 | 1011 | 111 (−3) |
| 1 | 1100 | 110 (−2) |
| 1 | 1101 | 110 (−2) |
| 1 | 1110 | 101 (−1) |
| 1 | 1111 | 101 (−1) |
| 1 | 0000 | 001 (+1) |
| 1 | 0001 | 001 (+1) |
| 1 | 0010 | 010 (+2) |
| 1 | 0011 | 010 (+2) |
| 1 | 0100 | 011 (+3) |
| 1 | 0101 | 011 (+3) |
| 1 | 0110 | 011 (+3) |
| 1 | 0111 | 011 (+3) |

The sign of the selected quotient digit, $q_{new}[2]$, is the same as the most significant partial remainder bit PR4. When the binary value of PR4 is one, the selected quotient digit is negative, when PR4 is zero, the selected quotient digit is positive. The sign of the selected quotient digit, $q_{new}[2]$, is inverted and passed to the XOR logic 540 and the adder 550 of FIG. 5 on control line 528. The sign determines whether the selected divisor multiple 524 is two's complemented before being added to the partial remainder. In the preferred embodiment, the selected divisor multiple is put into two's complement format when the selected quotient digit is negative (i.e., $q_{new}[2] = 1$).

The logic gates 602–606 assert a high SELQ1 signal when the three most significant partial remainder bits PR4, PR3, and PR2 are the same (i.e., all ones or all zeros). An assertion of the SELQ1 signal causes the multiplexer 530 to select a 1x-multiple of the divisor. Logic gates 628–630 determine that $q_{new}[1:0]$ has a binary value of 01. Thus, the selected quotient digit is either −1 or +1, depending upon the sign of the quotient as determined by the signal $q_{new}[2]$.

The logic gates 608–616 assert a high SELQ2 signal when the signal levels of the four most significant partial remainder bits PR4, PR3, PR2 and PR1 and the second most significant divisor bit D1 have a predetermined relationship as set forth in Table A. A high assertion of the SELQ2 signal causes the multiplexer 530 of FIG. 5 to select a 2x-multiple of the divisor. Accordingly, the logic gates 628–630 determine that signals $q_{new}[1:0]$ have a binary value of 10. The selected quotient digit is either −2 or 2, depending upon the sign of the quotient as determined by the signal $q_{new}[2]$.

The logic gates 618–626 assert a high SELQ3 signal when the signal levels of the four most significant partial remainder bits PR4, PR3, PR2 and PRI and the second most significant divisor bit D1 have a predetermined relationship as set forth in Table A. A high assertion of the SELQ3 signal causes the multiplexer 530 to select a 3x-multiple of the divisor. Accordingly, the logic gates 628–630 determine that signals $q_{new}[1:0]$ have a binary value of 11. The selected quotient digit is either −3 or 3, depending upon the sign of the quotient as determined by the signal $q_{new}[2]$.

The principles of the invention can also be applied to division in other radices. In an alternative embodiment performing radix-2 division, quotient digits are selected from the quotient digit set {−1, +1}, with the quotient digit 0 being excluded from the set. Such quotient digits include a sign bit and a magnitude bit for representing the value of the selected digit. In the radix-2 embodiment, the magnitude signal can only have a one value.

In another alternative embodiment performing radix-8 division, quotient digits are selected from the quotient digit set {−7, −6, −5, −4, −3, −2, −1, +1, +2, +3, +4, +5, +6, +7}. Once again, the quotient digit 0 is not included in the set. In the radix-8 embodiment, the selected quotient digits include a sign bit, and three magnitude bits for representing the absolute value of the selected digit. It should be clear that the principle of the invention can be extended to division of numbers expressed in even larger radices as long as the quotient digit 0 is absent from the set of selectable quotient digits.

FIG. 7A shows an exemplary implementation of the quotient accumulator 700 of FIG. 5 including logic circuit 701 according to the principles of the invention. The logic circuit 701 includes logic gates 702–706. Many other combinations of various logic gates may be used to achieve equivalent quotient accumulation as provided by the logic gate 702–706. The use of combinational logic to accumulate partial quotients provides an improvement in performance over the full-adders that are often used to calculate quotients at the completion of a division operation.

The quotient accumulator 700 receives a partial quotient, $q_{in}[19:0]$, from the previous divide step unit 400 on signal lines 410 and the quotient digit $q_{new}[2:0]$ selected by the quotient select logic 600 on signal lines 544, and outputs a new partial quotient $q_0[19:0]$ on signal lines 432.

In the preferred embodiment, the two least significant bits, $q_{new}[1:0]$, of the selected quotient digit become the two least significant bits, $q_0[1:0]$, of the new partial quotient $q_0[19:0]$. Signals $q_{in}[17:2]$ of the inputted partial quotient 410, $q_{in}[19:0]$, become the signals $q_0[19:4]$ of the new partial quotient 432. The logic circuit 701 produces the remaining signals, $q_0[3:2]$, of the new partial quotient 432 by combining the signals $q_{in}[1:0]$, the magnitude bits of the previously selected quotient digit, and $q_{new}[2]$, the sign bit of the currently selected quotient digit. It is noteworthy that the sign bit $q_{new}[2]$ of the currently selected quotient digit is incorporated into the accumulation of the new partial quotient 432. This is a marked divergence from the prior art dividers which used the sign bit to determine in which register, either the positive or the negative, to store the selected quotient digit.

An exclusive-OR (XOR) gate 702 receives inputs $q_{in}[0]$ and $q_{new}[2]$, and outputs the third least significant bit, $q_0[2]$, of the new partial quotient. NAND gate 704 and AND gate 706 combine to produce the fourth least significant bit, $q_0[4]$, from input signals $q_{in}[1:0]$ and $q_{new}[2]$. Signals $q_{in}[19:181]$ are not used to produce the partial quotient 808.

Figure 7B:
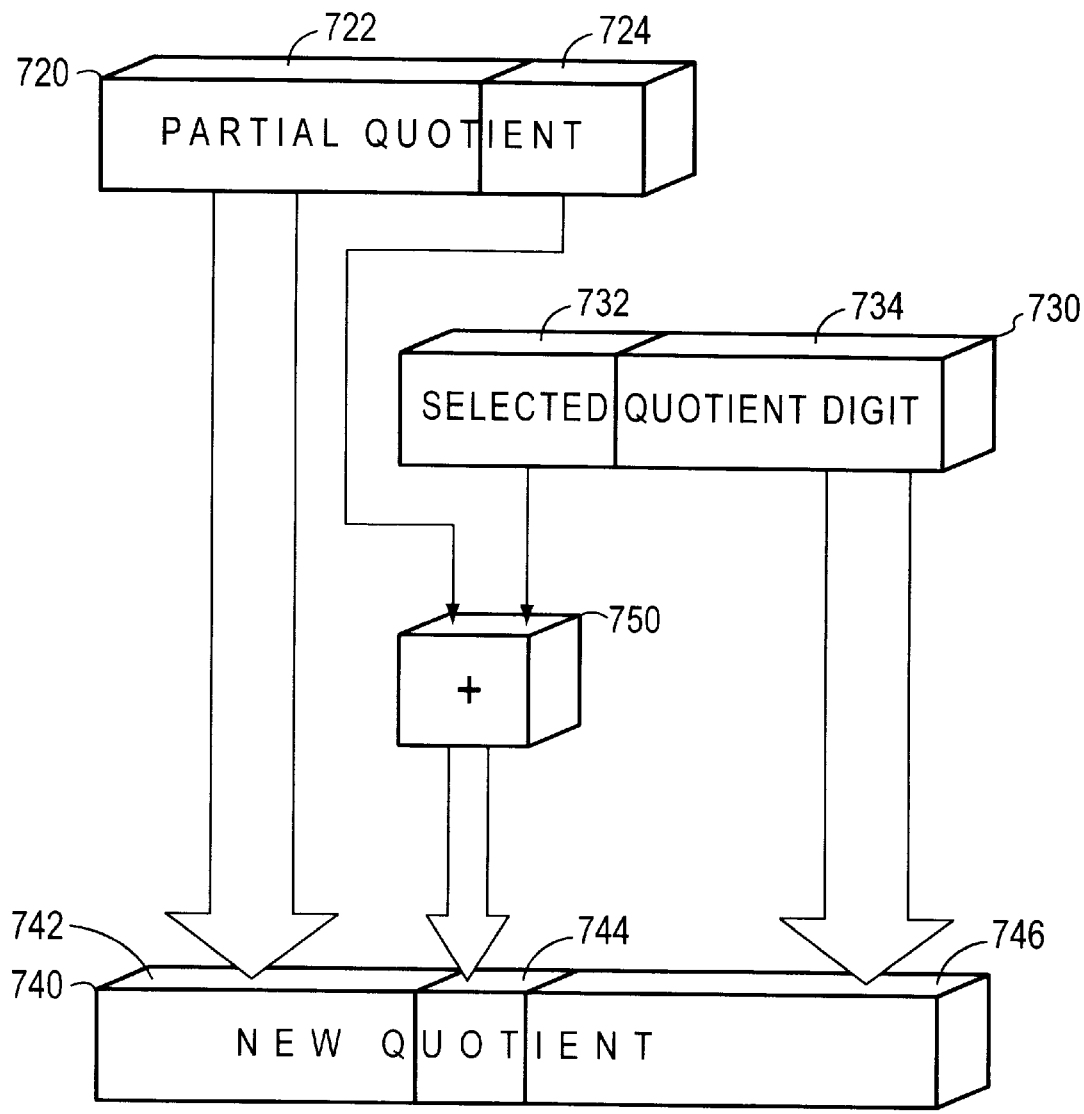
FIG. 7B illustrates the operation of combining a partial quotient with a selected quotient digit as performed by the quotient accumulator of FIG. 7A.

It should now be appreciated by those skilled in the art how the QSL 600 and the signed-magnitude representation of quotient digits greatly simplifies the accumulation of a quotient. FIG. 7B illustrates how simply a partial quotient 720 and a selected quotient digit 730 are combined to produce a new quotient 740.

The partial quotient 720 includes higher-order bits 722 and lower-order bits 724. The lower-order bits 724 are the same as the magnitude bits of the quotient digit previously selected by the first divide step unit 400. Because the QSL 600 never selects the quotient digit 0, at least one of the two magnitude bits of the previously selected quotient digit is a 1, i.e., in the preferred embodiment, the three possible binary values for the two magnitude bits are 01, 10, and 11.

The quotient digit 730, selected by the second divide step unit 401, includes a sign portion 732 and a magnitude portion 734. The selected quotient digit 730 is represented in sign-magnitude format.

Before the selected quotient digit 730 can be added to the partial quotient 720, the selected quotient digit 730 is sign-extended. For example, if the selected quotient digit 730 is $010_2$ (i.e., +2), then the sign-extended selected quotient digit becomes [0000 0000 0000 0000 $0010_2$] (extended to produce a 20-bit number). If instead the selected quotient digit is $110_2$ (i.e., −2), then the sign-extended binary number is [1111 1111 1111 1111 1110 2]. The sign portion 732 includes the sign-extension bits (i.e., the 17 most significant bits in the previous example) and the sign bit.

The new quotient 740 includes higher-order bits 742, intermediate bits 744 and lower-order bits 746.

A means for combining 750 produces the intermediate bits 744 using the lower-order bits 724 of the partial quotient and the sign portion 732 of the selected quotient digit 730. Exemplary implementations of the means for combining 750 are described in FIGS. 7A, and FIGS. 8–10.

When the partial quotient 720 is combined with the selected quotient digit 720, the sign portion 732 is added to the lower-order bits 724 (i.e., the magnitude bits of the previously selected quotient digit).

If the currently selected quotient digit is negative, then the sign portion 732 has all ones. Thus, adding the sign portion 732 to the magnitude bits 724 must generate a carry into the higher-order bits 722 of the partial quotient 720. For example, if the previously selected quotient digit is $011_2$ (+3), and the currently selected quotient digit is $110_2$ (−2), then the combining of the quotients is as follows:

```
  0000 0000 0000 0000 1100    partial quotient 720 (<<2)
+ 1111 1111 1111 1111 1110    sign-ext. quotient digit 730
  ─────────────────────────
  0000 0000 0000 0000 1010    new quotient 740
```

The result is that a carry into the higher-order bits 722, in this example the 16 most significant bits, ensures that the higher-order bits 742 of the new quotient 740 and the higher-order bits 722 of the previous partial quotient 720 (shifted by 2) are the same. Also, the lower-order bits 746 of the new quotient 740 and the magnitude portion 734 of the selected quotient digit 730 are the same.

If the previously selected quotient digit is $011_2$ (+3), and the selected quotient digit 730 is positive, i.e., $001_2$ (+1), then the combining of the quotients is as follows:

```
  0000 0000 0000 0000 1100    partial quotient 720 (<<2)
+ 0000 0000 0000 0000 0001    sign-ext. quotient digit 730
  ─────────────────────────
  0000 0000 0000 0000 1101    new quotient 740
```

Once again, the higher-order bits 742 of the new quotient 740 and the higher-order bits 722 of the partial quotient 720 (shifted by 2) are the same, as are the lower-order bits 746 of the new quotient 740 and the magnitude portion 734 of the selected quotient digit 730.

Thus, it can be seen that the higher-order bits 742 can come directly from the higher-order bits 722 of the partial quotient 720, and that the lower-order bits 746 can come directly from the magnitude bits 734 of the selected quotient digit 730. Only the intermediate bits 744 are not immediately determinable from either the partial quotient 720 or the selected quotient digit 730. But because 18 of the 20 bits of the new quotient 740 can be derived directly from either the partial quotient 720 or the selected quotient digit 730, the means for combining 750 can be tailored to efficiently determine the other two bits.

FIG. 8 shows an exemplary implementation of a quotient accumulator 800 for the radix-2 alternative embodiment. The quotient accumulator includes an XOR gate 802 for accumulating intermediate and final quotients. Other combinations of logic gates may be used to achieve equivalent quotient accumulation as provided by the XOR gate 802.

The quotient accumulator 800 receives a partial quotient, $q_{in}[19:0]$, from a previous divider stage or divide step unit on signal lines 804 and a selected quotient digit $q_{new}[1:0]$ on signal lines 806, and outputs a new partial quotient $q_{new}[19:0]$ on signal lines 808. The least significant bits, $q_{new}[0]$, of the selected quotient digit becomes the least significant bit, $q_0[0]$, of the new partial quotient $q_0[19:0]$. The XOR gate 802 receives inputs $q_{new}[1]$ and $q_{in}[0]$, and outputs the second least significant bit, $q_0[1]$, of the new partial quotient. Signals $q_{in}[19:1]$ of the inputted partial quotient, $q_{in}[19:0]$, become the remaining signals, $q_0[19:2]$, of the new partial quotient 808.

The combinational logic needed to implement the radix-8 alternative embodiment is more complicated than the logic used to implement the quotient accumulators 700 and 800, but the general principle is the same: intermediate and final quotients can be accumulated at each divide unit as the quotient digits are selected, thus avoiding having to construct the quotient at the last stage of the division operation, which can involve extensive and lengthy carry propagation.

Figure 9:
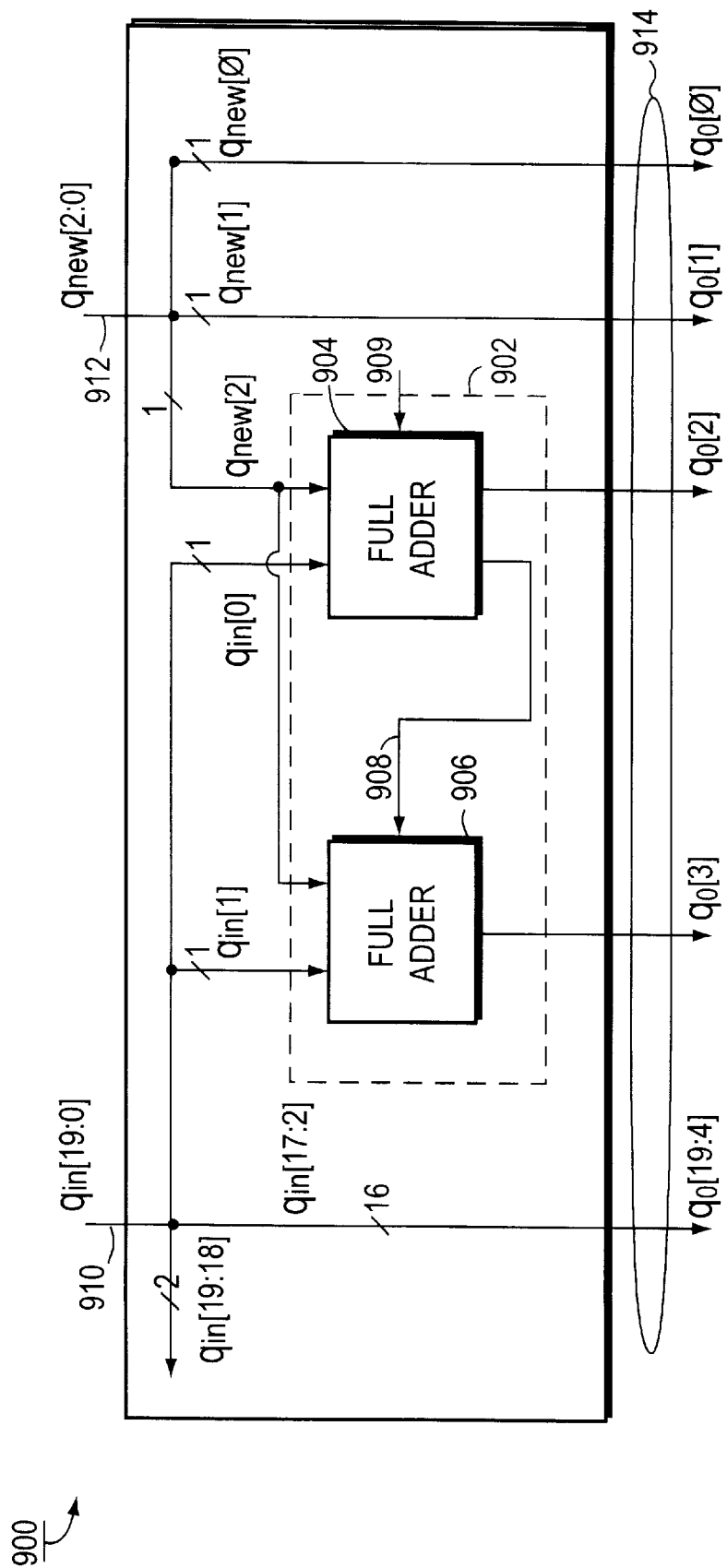
FIG. 9 shows an exemplary alternative implementation of the quotient accumulator including an two-bit adder.

FIG. 9 shows an alternative exemplary implementation of a quotient accumulator 900 including an two-bit adder 902. Like the previous embodiment discussed above in FIG. 7A, signals $q_{in}[17:2]$ of the inputted partial quotient on signal lines 910 become the signals $q_0[19:4]$ of the new partial quotient 914; signals $q_{new}[1:0]$ of the selected quotient digit on signal lines 912 become signals $g_0[1:0]$ of the new partial quotient 914; and input signals $q_{in}[1:0]$ of the partial quotient 910 and $q_{new}[2]$ of the selected quotient digit are combined to determine the signals $q_0[3:2]$ of the new partial quotient 914. In this alternative embodiment, the two-bit adder 902 is used to combine the signals $q_{in}[1:0]$ and $q_{new}[2]$.

The two-bit adder 902 includes two full-adders 904–906 coupled to each other by a carry-in signal line 908. The full-adder 904 receives inputs $q_{in}[0]$, $q_{new}[2]$, and a carry-in signal 909, and generates output signal $q_0[2]$ of the new partial quotient 914 and carry-in signal 908. Since the full-adder 904 is the rightmost full-adder of the two-bit adder 902, no carry propagates into the full-adder 904; the carry-in signal 909 is maintained at a zero value.

The full-adder 906 receives inputs $q_{in}[1]$, $q_{new}[2]$, and the carry-in signal 908, and generates signal $q_0[3]$ of the new partial quotient 914. The full-adder 906 does not propagate a carry signal. It can be seen, therefore, from this alternative embodiment that the propagation of a carry signal is limited to those bits that are being combined by the quotient accumulator 900. In fact, in this alternative embodiment, a carry can propagate, at most, one bit position, from full-adder 904 to full-adder 906. This limited carry propagation ensures that the accumulating of a quotient can be accomplished within the system clock cycle. Thus, partial quotients can be determined as quotient digits are selected rather than postponing the combining of the quotient digits until after all the digits have been determined.

Figure 10:
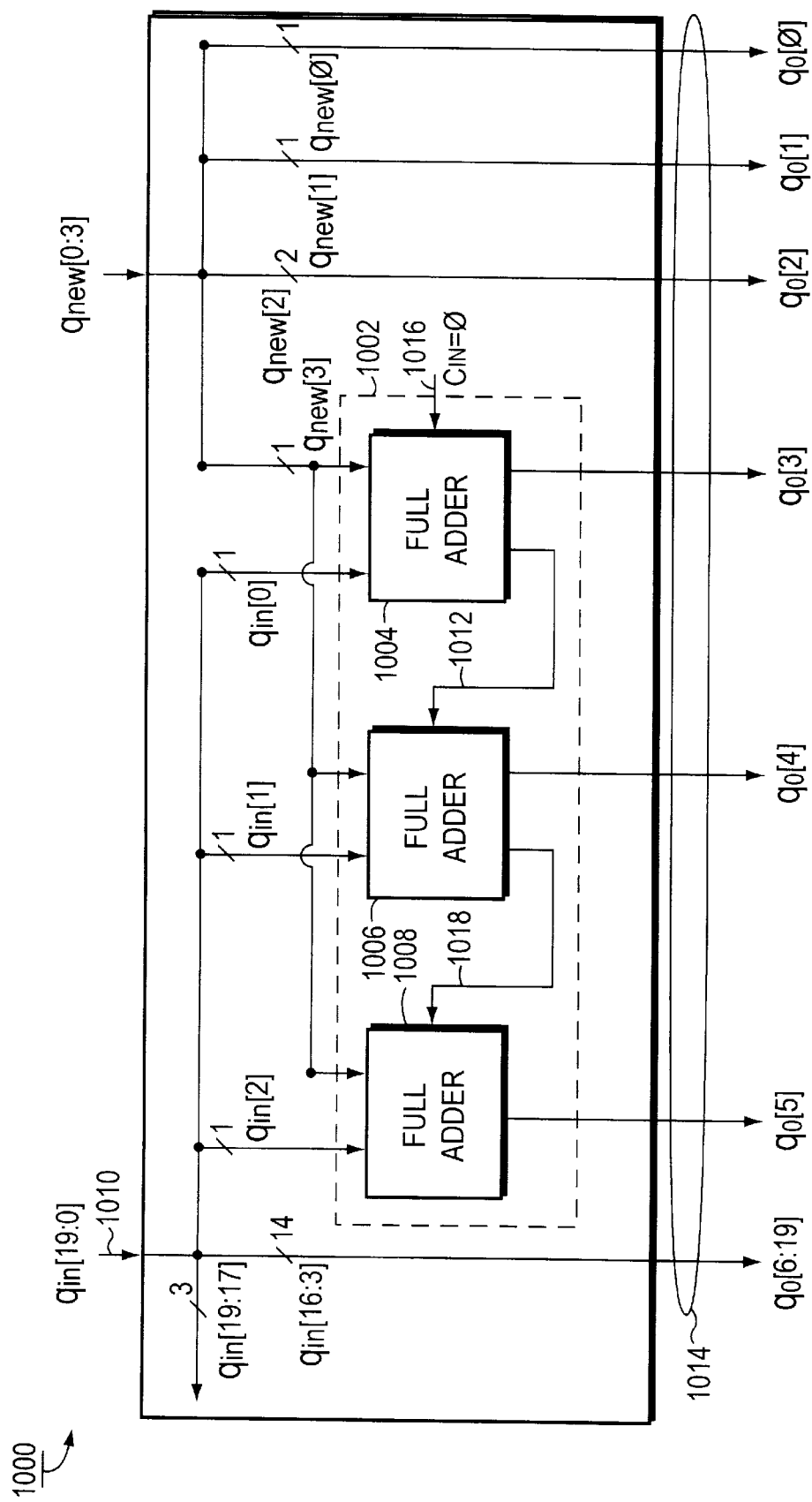
FIG. 10 shows another exemplary embodiment of the quotient accumulator for a radix-8 divider.

FIG. 10 shows an alternative exemplary embodiment of a quotient accumulator 1000 including an adder 1002. The quotient accumulator 1000 illustrates how the principles of the invention can be extended to a radix-8 divider in which four-bit quotient digits (one sign bit and three magnitude bits) are selected at each divide step unit.

In this alternative embodiment, three input signals, $q_{new}[2:0]$, which are the magnitude bits of the currently selected quotient digit, become the signals $q_0[2:0]$ of the new partial quotient 1014. Input signals $q_{in}[16:3]$ of the inputted partial quotient 1010 become the signals $q_0[19:6]$ of the new partial quotient 1014. The adder 1002 produces the remaining signals, $q_0[5:3]$, of the new partial quotient 1014 by combining the signals $q_{in}[2:0]$, the magnitude bits of the previously selected quotient digit, and $q_{new}[3]$, the sign bit of the currently selected quotient digit.

The three-bit adder 1002 includes three full-adders 1004, 1006, 1008. The full-adder 1004 generates signal $q_0[3]$ of the new partial quotient 1014 and a carry signal 1012 from inputs $q_{in}[0]$, $q_{new}[3]$, and carry-in signal 1016. The carry-in signal 1016 to the full-adder 1004 is maintained at a zero value.

Full-adder 1006 receives inputs $q_{in}[1]$, $q_{new}[3]$, and the carry signal 1012, and generates signal $q_0[4]$ of the new partial quotient 1014 and a carry signal 1018. Full-adder 1008 generates signal $q_0$ [5] of the new partial quotient 1014 from inputs $q_{in}$[2], $q_{new}$[3], and the carry signal 1018.

In this alternative embodiment, at most, two carry signals 1012 and 1018 can propagate in the determination of the new partial quotient 1014, which is one more carry signal than the alternative embodiment of FIG. 9. Again the propagation of a carry signal is limited to those bits that are being combined by the quotient accumulator 1000. This embodiment would require fewer divider stages than used by divider 300 in order to produce a twenty-bit final quotient. From the alternative embodiments in FIGS. 9–10, it can be seen that the propagation of carry signals is limited to n–1 bits, where n is the number of magnitude bits of a selected quotient digit.

Figure 11:
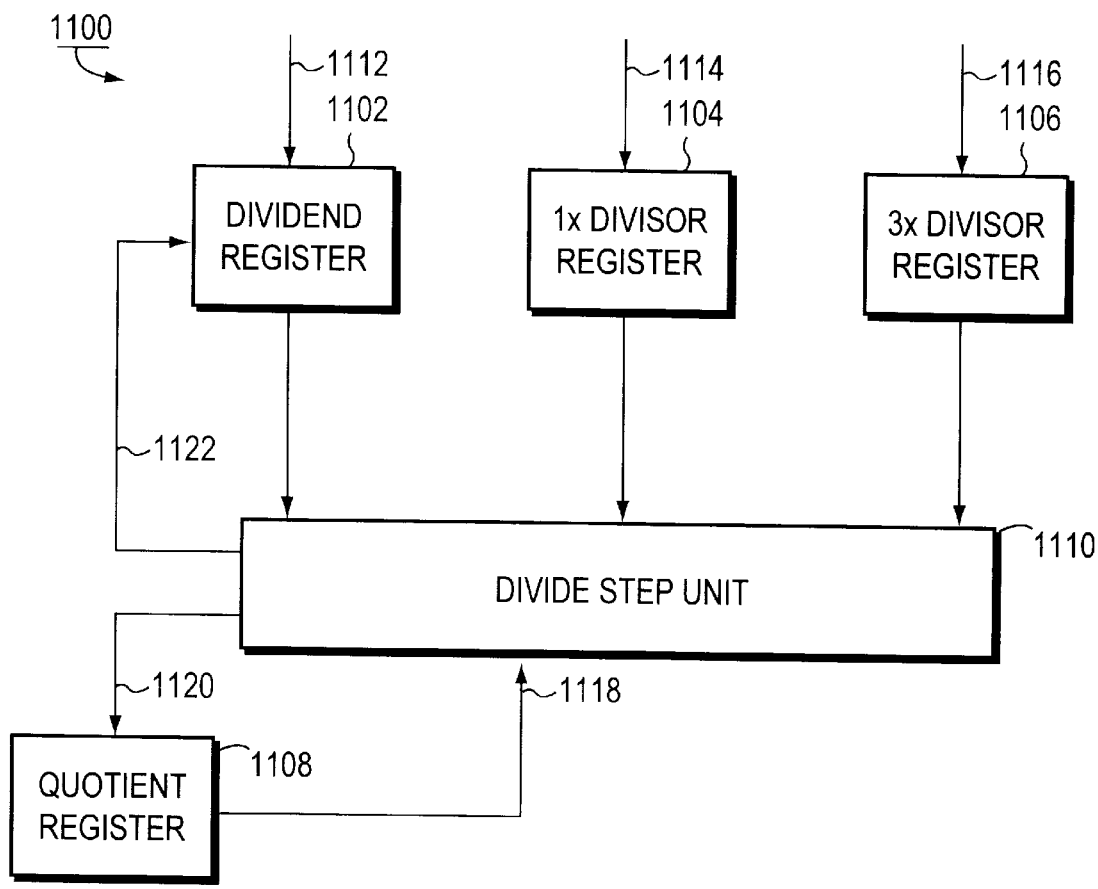
FIG. 11 shows an alternative exemplary implementation of a divider according to the principles of the invention.

FIG. 11 shows an alternative exemplary implementation of a divider 1100 according to the principles of the invention. The divider 1110 includes a dividend register 1102, a 1x-divisor register 1104, a 3x-divisor register 1106, a quotient register 1108 and a divide step unit 1110. The registers 1102, 1104, 1106, and the divide step unit 1110 are each implemented like their respective named counterparts described in FIG. 4.

The divide step unit 1110 is coupled to receive input signals from each of the registers 1102, 1104, 1106, 1108, and to send output signals to the dividend register 1102 and quotient register 1108.

During the operation of the divider 1100, the dividend register 1102 maintains the partial remainder throughout the division operation. Initially, the partial remainder is the initial normalized dividend received on signal lines 1112. The 1x-divisor register 1104 stores a 1x-multiple of a normalized divisor received on signal lines 1114. The 3x-divisor register 1106 stores a 3x-multipleof the normalized divisor received on signal lines 1116. The quotient register 1108 stores the current quotient throughout the division operation.

According to the principles of the invention, the divide step unit 1110 iteratively selects quotient digits and combines each selected quotient digit with the current quotient received from the quotient register 1108 on signal lines 1118 until a final quotient is produced. Also in accordance to the principles of the invention, upon each iteration, the divide step unit 1110 produces and sends a new current quotient to the quotient register 1108 on signal lines 1120, and a new partial remainder to the dividend register 1102 on signal lines 1122. When the final quotient is produced, the final partial remainder can be obtained from the dividend register 1102 and the final quotient can be obtained from the quotient register 1108.

It is to be understood that the above-described embodiments are simply illustrative of the principles of the invention. Various other modifications and changes may be made by those skilled in the art which will embody the principles of the invention and fall within the spirit and the scope thereof.

What is claimed is:

1. An apparatus for performing non-restoring division, comprising:

means for selecting digits to be used in producing a final quotient, the means for selecting operating to select only digits that have a non-zero value and selecting digits until a final quotient is produced; and means for combining each selected digit with a current partial quotient to produce a new current partial quotient.

2. The apparatus according to claim 1 wherein each selected digit is represented in a sign-magnitude format, each selected digit including a sign portion that indicates whether each selected digit is negative or positive; and the means for combining operates to add the sign portion of each selected digit to the current partial quotient when producing the new current partial quotient.

3. The apparatus according to claim 2 wherein each selected digit includes a magnitude portion representing an absolute value of each selected digit, the magnitude portion including one or more bits according to a radix of the division; and the means for combining appends the magnitude portion of each selected digit to a result of adding the sign portion of each selected digit to the current partial quotient.

4. The apparatus according to claim 2 wherein the sign portion of each selected digit includes a sign bit, and, when a radix of the division is N, where N is an integer that is greater than two and is a power of two, an extension of the sign bit.

5. The apparatus according to claim 1 wherein each selected digit includes a sign portion that indicates whether each selected digit is negative or positive;

the current partial quotient is represented as digits including a least significant digit preceded by a series of one or more upper digits, the least significant digit having a lesser positional value than any preceding upper digit; and the means for combining operates to add the sign portion to the least significant digit when combining each selected digit to the current partial quotient, the means for combining limiting any carries produced by the adding from propagating to the series of upper digits of the current partial quotient.

6. The apparatus of claim 5 wherein each selected digit includes a magnitude portion that represents an absolute value of each selected digit, and the least significant digit of the current partial quotient is the magnitude portion of a previously selected digit.

7. The apparatus according to claim 5 wherein each selected digit further includes a magnitude portion that represents an absolute value of each selected digit; and the means for combining operates to append the magnitude portion to a result of the adding the sign portion to the least significant digit of the current partial quotient, and to prefix the series of upper digits of the current partial quotient to a result of the appending.

8. An apparatus according to claim 1 wherein each selected digit includes a sign portion that indicates whether each selected digit is negative or positive;

the current partial quotient includes digits including a least significant digit; and the means for combining includes combinational logic for combining the sign portion of each selected digit with the least significant digit of the current partial quotient.

9. An apparatus according to claim 1 wherein each selected digit includes a sign portion that indicates whether each selected digit is negative or positive;

the current partial quotient includes digits including a least significant digit, the least significant digit being represented by one or more data bits; and the means for combining includes an adder for each data bit of the least significant digit for adding the sign portion to the least significant digit of the current partial quotient when combining each selected digit to the current partial quotient, the means for combining limiting any carries produced by the adding from propagating to a higher digit of the current partial quotient.

10. A divider for performing non-restoring radix-N division of a remainder by a divisor, where N is an integer of the power of two, the divider comprising:

a divider stage including:

quotient select logic for selecting digits to be used in producing a final quotient, the quotient select logic operating to only select digits that have a non-zero value; and a quotient accumulator for combining each selected digit with a current partial quotient to produce a new current partial quotient, the digits being selected and combined until the final quotient is produced.

11. The divider of claim 10 wherein the divider stage is a first divider stage and further comprising:

one or more other divider stages successively coupled to the first divider stage in a pipeline, each divider stage including an adder for producing a partial remainder and a register, coupled to the adder, for maintaining the partial remainder, the adder and the register of each divider stage that succeeds the first divider stage in the pipeline being smaller in size than the adder and the register, respectively, of the preceding divider stage.

12. A method for performing non-restoring division, comprising the steps of:

selecting only non-zero digits for use in producing a final quotient;

combining each selected digit with a current partial quotient to produce a new current partial quotient; and repeating the steps of selecting and combining until the final quotient is produced.

13. The method according to claim 12 wherein the steps of selecting and combining are performed concurrently for each digit selected.

14. The method of claim 12 in which the step of combining comprises the steps of:

representing each selected digit in a sign-magnitude format wherein the selected digit includes a sign;

sign-extending the sign of each selected digit;

multiplying the current partial quotient by N, where N is an integer representing a radix of the division; and adding each sign-extended selected digit to the multiplied current partial quotient to produce the new current partial quotient.

15. The method according to claim 12 in which the steps of combining comprises:

representing each selected digit in a sign-magnitude format, each selected digit including a sign portion that indicates whether each selected digit is negative or positive; and adding the sign portion of each selected digit to the current partial quotient when producing the new partial quotient.

16. The method according to claim 15 wherein each selected digit includes a magnitude portion representing an absolute value of each selected digit, the magnitude portion including one or more bits according to a radix of the division; and further comprising the step of:

appending the magnitude portion of each selected quotient digit to the result of adding the sign portion of each selected quotient digit as the least significant bits of the new partial quotient.

17. The method according to claim 12 wherein the current partial quotient is represented as digits including a least significant digit preceded by a series of one or more upper digits, the least significant digit having a lesser positional value than any preceding upper digit;

each selected digit includes a sign portion that indicates whether each selected digit is negative or positive, and a magnitude portion that represents an absolute value of each selected digit; and the step of combining each selected digit with the current partial quotient includes the steps of:

adding the sign portion of each selected digit to the least significant digit of the current partial quotient;

appending the magnitude portion to a result of adding the sign portion to the least significant digit of the current partial quotient; and prefixing the series of upper digits of the current partial quotient to a result of appending.

* * * * *